Oct. 4, 1932.   H. J. WEYDERT   1,881,155
SHOCK AND VIBRATION ABSORBING AND DAMPING DEVICE
Filed Dec. 6, 1928

Inventor
Hubert Jules Weydert
By B. Singer, Atty.

Patented Oct. 4, 1932

1,881,155

UNITED STATES PATENT OFFICE

HUBERT JULES WEYDERT, OF LEVALLOIS PERRET, FRANCE

SHOCK AND VIBRATION ABSORBING AND DAMPING DEVICE

Application filed December 6, 1928, Serial No. 324,266, and in France December 31, 1927.

Shock absorbers have become known, more especially by the U. S. A. Patent No. 1,679,698, comprising an arrangement of reinforced rubber elements arranged in cascade form, in which the rubber elements operate in successive layers while the metallic elements resist lateral deformations, and are formed either of discs, or of a band of soft metal arranged in a helix and not operating as a spring but solely as a reinforcing element.

It is necessary in respect of each individual element, not to exceed a certain height (proportional to the diameter and practically equal to 1.10 times this) if buckling is to be avoided. Hence there is necessity of employing for a considerable movement a series of superposed elements separated by guiding washers with central bearings if internal guides are used or with peripheral bearings if external guiding is adopted.

The improvement forming the object of the present invention aims at obviating this inconvenience and consists in employing helicoidal elements of large size and using only part thereof for covering the rubber. Hence part of the helicoidal element is left free: and one of its edges, the interior or exterior forms the guiding means. It is thus possible to make elements which are very long, and which avoid the need of superposing ordinary elements when large movement is required. Further, as the guiding takes place over the whole length there is no risk of buckling.

This improvement will be better understood by reference to the accompanying drawing in which.

Figure 1:
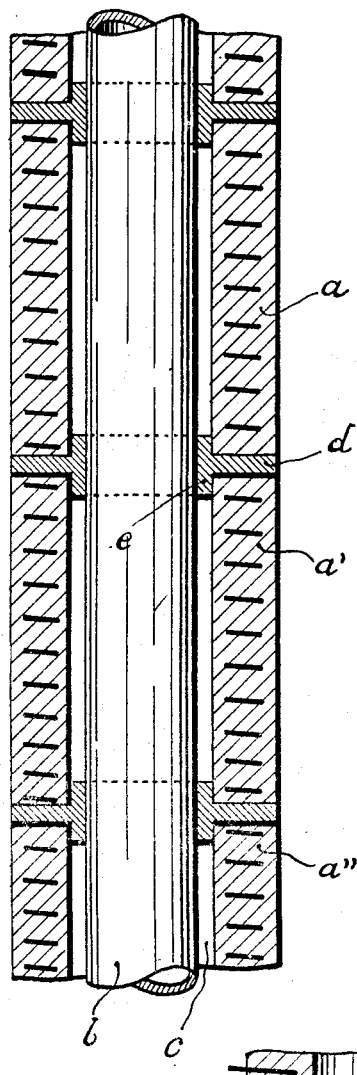
Fig. 1 is a sectional view of a device according to said Patent No. 1,679,698.

According to the arrangement proposed in the parent case, and shown in Fig. 1 the rubber elements $a$, $a'$, $a''$ were supposed threaded upon a common guide $b$, internal or external, as required with play $c$ sufficient to permit of the variations of diameter at the moment of applying the charge, the mass of rubber tending to crease and form internal undulations as well as external ones, under load.

The guiding was then obtained by washers $d$ isolating the elements one from the other and having shoulders filling, in the case shown (Fig. 1) internal guiding, the play $c$ provided between the rubber block and the guiding member.

Being only guided at its extremities, the element $a$ could not be given a greater height or length than from 1.10 to 1.20 of its diameter. This often necessitated the use of a whole series of elements $a$, $a'$, $a''$.

In the present invention, however, the aim is to realize the guiding of the tubular compressible element $h$ over the entire height of these elements so as to avoid any risk of wobbling and indirectly to permit in this manner the utilization of elements of very great height. This was not possible in the prior devices.

Figure 2:
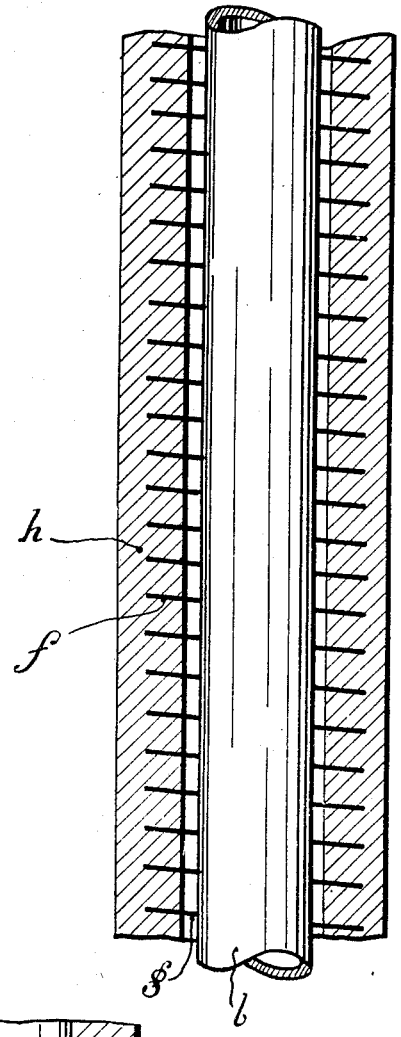
Fig. 2 is a similar view of my improved device.
Figure 3:
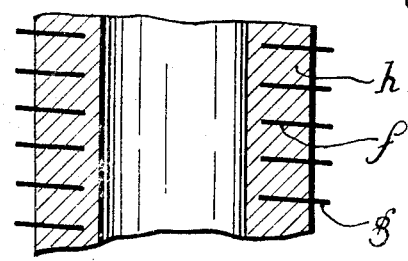
Fig. 3 is a similar view of a modified form of my improved device.

For this purpose the helicoidal element $f$ formed of a very thin plate rolled flat into helical shape is selected for the great length, Figures 2 and 3, and a portion only of this size is embedded in the mass of rubber of the element $h$.

The helicoidal element $f$, therefore, rests in bare condition on a portion $g$ and projects beyond the rubber mass and this projecting portion $g$ is utilized for guiding the element $h$, the guiding device being formed by a tube $b$ placed concentrically with respect to the element $h$ either in the center thereof or on the outside thereof.

In the construction shown in Figure 2, the portion of the helicoidal element $f$ also projects towards the center beyond the rubber mass while in the construction shown in Fig. 3 the part $g$ of the reinforcement left blank projects beyond the periphery and beyond the mass of rubber. In each of such constructions the border $g$ touches the guiding element $b$.

Owing to this guiding element extending over the entire height the shock absorber can therefore be made of a single rubber element $h$ of a length as great as required because the guiding is effected along the whole length of the element on the edge (whether internal or external) of the helicoidal element without interruption instead of, as previously, solely at the ends of each element.

At the same time all risk of buckling is avoided.

My improved shock absorber is of maximum efficiency, and modifications may be made therein within the scope of the appended claim.

What I claim, is:

A shock absorber comprising a guide element and a continuous tubular element of elastic compressible material such as rubber and a continuous helicoidal reinforcing member in said compressible tubular element, the convolutions of said helicoidal member being appropriately spaced apart and each partly embedded in the material of the tubular element and partly projecting therefrom toward the guide element and presenting edge surfaces for contact with the guide element.

In witness whereof I affix my signature.

HUBERT JULES WEYDERT.